Inventor:
James R. Adams,

United States Patent Office 3,427,693
Patented Feb. 18, 1969

3,427,693
WEBBING FASTENER
James R. Adams, Boston, Mass., assignor, by mesne assignments, to United-Carr Incorporated, Boston, Mass., a corporation of Delaware
Filed Nov. 12, 1965, Ser. No. 507,499
U.S. Cl. 24—222                                                        1 Claim
Int. Cl. A44b *17/00*

ABSTRACT OF THE DISCLOSURE

A fastening system which secures a webbing strip to a sheet metal structure comprises a plurality of small headed studs which are welded to the structure and a plurality of slotted sockets secured to the webbing strip adjacent its ends. The stud heads are passed through the slots in the sockets and are seated in pockets formed between the sockets and the strip and do not pass through the strip per se.

---

This invention relates to an improved fastening system for securing webbing strips to a sheet metal structure, for example, a tubular framed aluminum lawn chair.

An object of the invention is to provide a simple, inexpensive, easily installed and highly efficient fastening system for securing webbing strips to a sheet metal structure.

Another object of the invention is to provide a fastening system for securing webbing strips to sheet metal structures wherein the male component of the system is attached to the structure without perforation thereof.

A still further object of the invention is to provide a fastening system for the above recited purpose wherein the female component of the system is heat sealed to the webbing strip.

Figure 1:
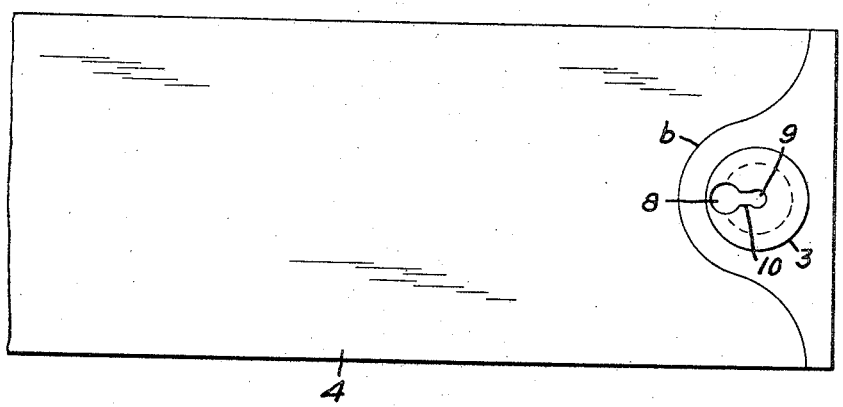
Figure 2:
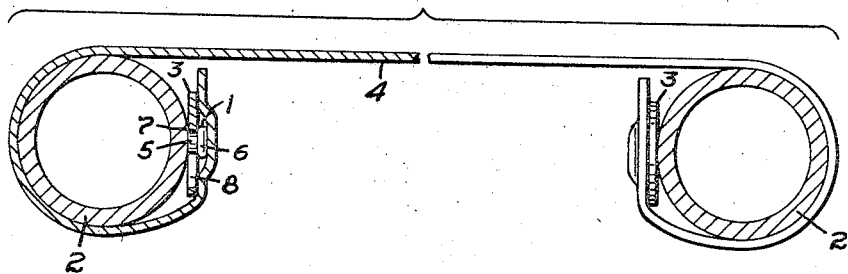

Other objects and advantages of the novel fastening system will be evident from your reading of the following description in conjunction with a viewing of the accompanying drawings in which:

FIG. 1 is a plan view of a webbing strip having a socket member according to the invention secured thereto; and FIG. 2 is a view of an installation partly in section, depicting the fastening system as employed to secure a webbing strip to a tubular sheet metal structure.

As illustrated in the drawings the fastening system comprises a plurality of small metal studs 1 which are fusedly attached by welding or some other means to a surface of the sheet metal structure 2 and a plurality of female sockets 3 which are adapted to be secured to the webbing strip 4 adjacent the opposite ends thereof.

Each of the studs 1 includes a shank 5 and a generally circular head 6. The end of the shank remote from the head is welded to the sheet metal structure 2 such that the head 6 is spaced from but lies close to the surface of the structure and the inner surface of the head 7 faces inwardly toward the surface of the structure.

The socket 3 is in the form of a flat, planar, generally circular wafer in this instance having been formed from a synthetic thermoplastic resin, for example, polyvinyl chloride.

The central portion of the socket is provided with an elongated slot having an enlarged generally circular stud head receiving portion 8, a smaller, generally circular stud shank receiving portion 9 and a neck portion 10 having generally parallel sides connecting the stud head and stud shank receiving portions 8 and 9.

As shown in the drawings the socket 3 is dielectrically heat sealed at its outer peripheral edge to the cloth vinyl webbing strip 4 adjacent the ends of strip and the socket central portion and the webbing strip co-operate to provide a stud head receiving pocket therebetween. The line *b* in FIG. 1 outlining a portion of the end of the strip 4 indicates that the individual strands of the vinyl webbing strip have been fused or heat sealed together when the socket was attached to the strip to prevent any unravelling of the strip and to eliminate the necessity of binding or hemming the ends thereof.

The tubular shaped supporting elements 2 in FIG. 2 represent the end frame members of the seat of an aluminum lawn chair. Each of the supports 2 has a plurality of studs 1 welded to the surface thereof. The webbing strip 4 is secured by passing the stud head 6 on the left hand member through the aperture 8 in the socket and drawing the strip downwardly until the stud shank seats in the opening 9. Thereafter the strip is wrapped over the left hand member 2 and stretched over and around the right hand member until the stud on the latter member is engaged in the socket on the opposite strip end in a similar manner. Thus the webbing strip is effectively secured without the use of sophisticated sheet metal clips and without providing apertures and cutouts in the tubular members to receive such clips.

It is to be understood that what has been disclosed herein for purposes of illustration is not to be interpreted in a limiting sense in that the scope of the invention is best defined by the following claim.

I claim:

1. A fastening system securing a webbing strip to a sheet metal structure comprising a plurality of small metal studs each having a head and a shank secured to a surface of the structure at the end of the shank remote from the head without perforation of the structure whereby the head of each stud is spaced from but lies in close proximity to the surface of the structure with the undersurface of the head facing inwardly toward the surface of the structure, and a plurality of female socket members attached to the webbing strip adjacent opposite ends thereof, each of said sockets being in the form of a generally flat planar wafer of synthetic thermoplastic material which is heat sealed to the webbing strip along its outer peripheral edge and cooperating with the webbing strip to provide a stud head receiving pocket therebetween, each of said sockets being provided with an elongated slot including an enlarged, generally circular stud head receiving portion, a small generally circular stud shank receiving portion and a neck portion having generally parallel sides connecting the stud head and stud shank receiving portions, said studs being engaged with said socket members, each of said stud shanks being seated in the stud shank receiving portion of one of said slots and each of said stud heads being seated in one of said pockets between one of said sockets and said webbing strip.

References Cited

UNITED STATES PATENTS 509,802    11/1893    Gunn _____ 24—222

BOBBY R. GAY, *Primary Examiner.*

E. SIMONSEN, *Assistant Examiner.*